Patented May 20, 1924.

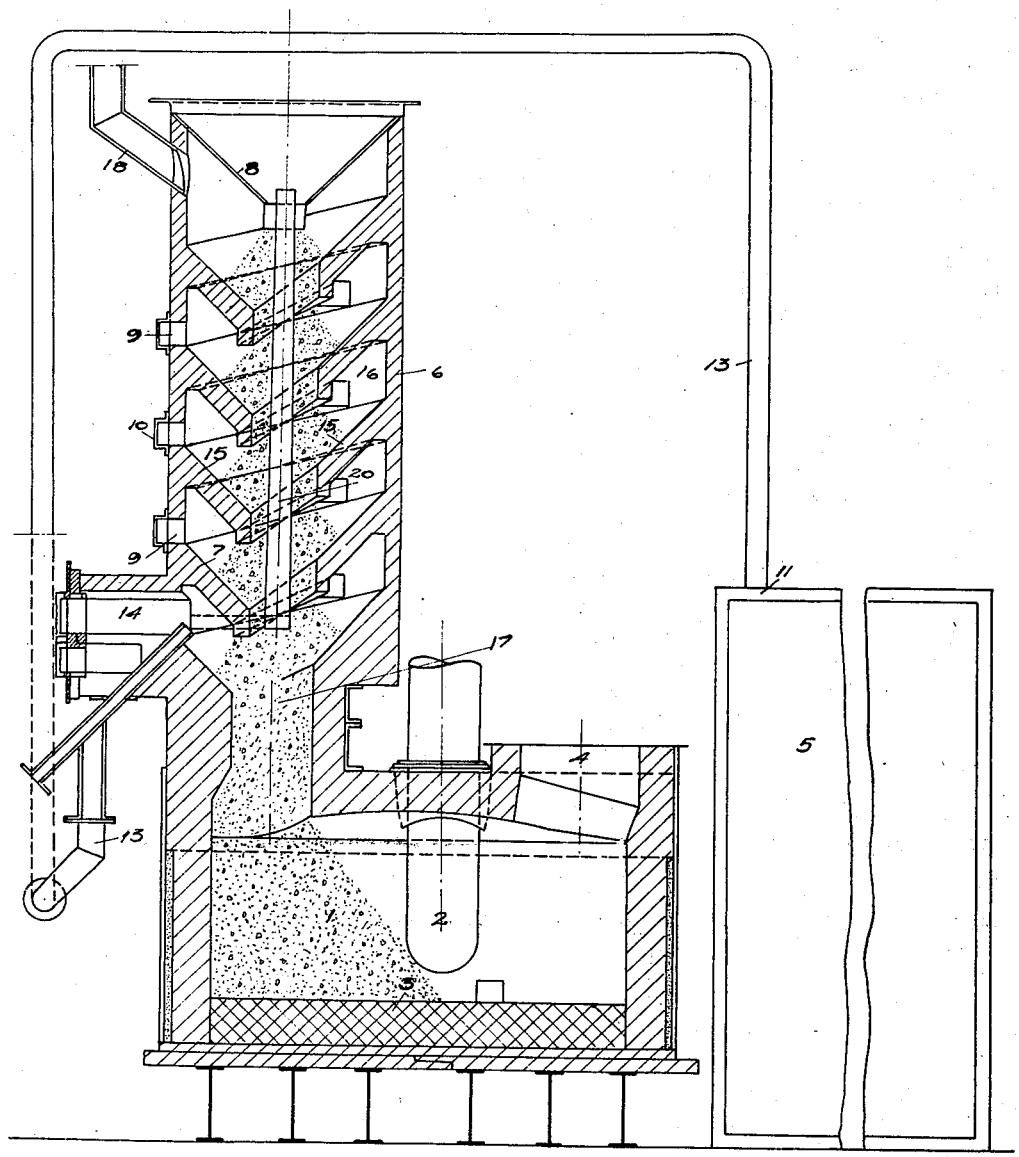

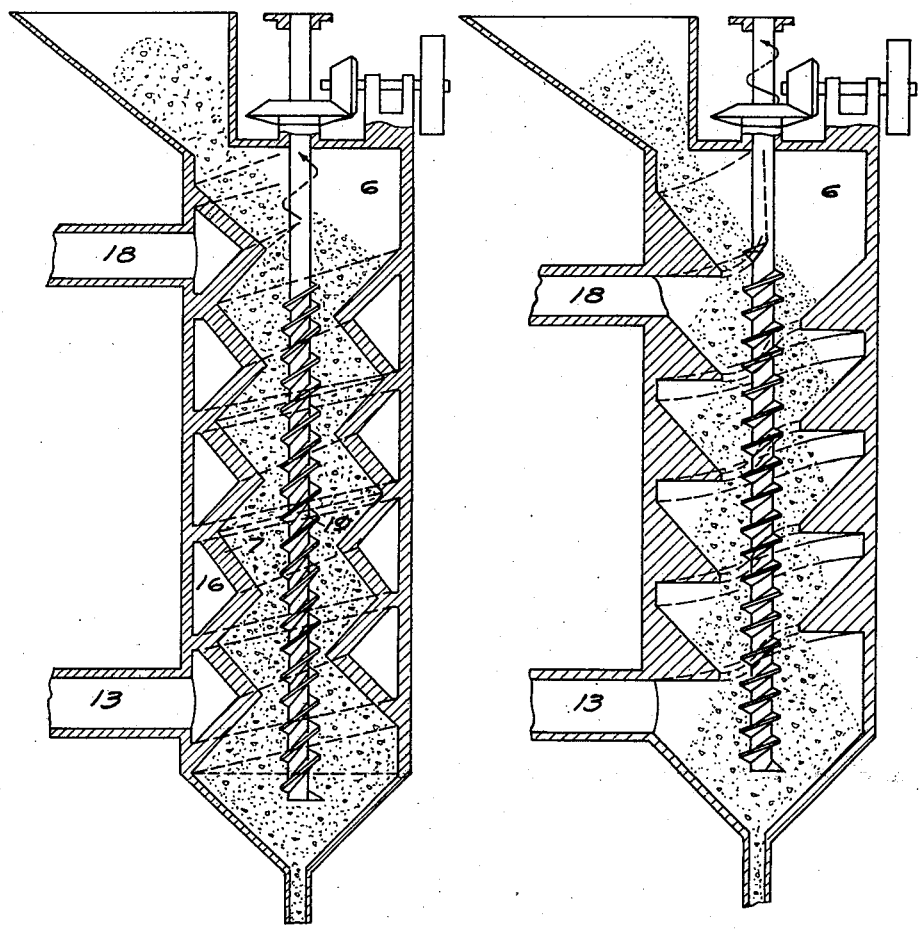

1,495,077

UNITED STATES PATENT OFFICE.

EDVIN ANDREAS JOHANSSON, OF STOCKHOLM, AND GUSTAF JULIUS EKLUND, OF TROLLHATTAN, SWEDEN, ASSIGNORS TO TROLLHÄTTANS ELEKTROTHERMISKA AKTIEBOLAG, OF STOCKHOLM, SWEDEN.

METHOD OF AND APPARATUS FOR EXTRACTING ZINC FROM ITS ORE.

Application filed September 22, 1921. Serial No. 502,487.

*To all whom it may concern:*

Be it known that we, EDVIN ANDREAS JOHANSSON and GUSTAF JULIUS EKLUND, subjects of the King of Sweden, residing at Stockholm, Sweden, and Trollhattan, Sweden, have invented certain new and useful Improvements in the Methods of and Apparatus for Extracting Zinc from Its Ore, of which the following is a specification.

The present invention has reference to an improved method and apparatus for extracting zinc from its ore, while the object is to obtain an augmented smelting effect in the furnace and an augmented metal content in the zinc vapors generated, whereby the condensation of said vapors to fluid zinc is facilitated, while the amount of zinc powder, generated in the condenser, is diminished. The method also contemplates a simplified introduction of the charge into the furnace with the purpose of reducing manufacturing expenses.

In the electrothermic extraction of zinc especially the charge, consisting of ore, charcoal and other reagents necessary for the extraction of the zinc from the ore, together with slag forming substances, usually is introduced in a very finely divided condition, and it has been shown, that the charge in the form of a powder, has a great disposition to attract moisture from the air during its storage. The water, which is thus introduced together with the charge into the electric furnace, requires heat so as to be transformed into steam, and this in itself means a loss of heat in the electro-thermic extraction of zinc. In addition the generated steam dilutes the gases, usually generated in the furnace to such an extent as to interfere with the condensation of the zinc gases to liquid zinc.

Another considerable loss of heat in the electro-thermic extraction of zinc is caused by the carbon monoxide gases, inasmuch as said gases escape from the condenser without being utilized in any manner.

In order to avoid all these inconveniences it is proposed to introduce the finely divided charge into the electric furnace in a preheated, dried and partly reduced condition, and in which the carbon monoxide gases escaping from the condenser are utilized as a heating means.

According to the invention the carbon monoxide gases are used for drying or reducing the charge, whereby the preheating or reduction takes place during the flow of the charge along a screw or spiral shaped surface whereby the charge is agitated during the action of the hot gases. To the smelting chamber of the electric furnace is connected a shaft for introducing the charge, through which the charge flows from the top downward along a spiral shaped surface, being turned about or agitated from an overlying spiral layer to an underlying layer. The inner wall of the shaft for this purpose is provided with a spiral shaped flange or wall, on which the charge is introduced. The shaft is connected at its lower end with the outlet of the carbon monoxide gas from the condenser, and said carbon monoxide gas is ignited and is caused to pass upwardly in an opposite direction to the direction of the charge, falling down, outside of the same, along a spiral shaped path and, it may be, in contact with the charge, whereby the combustion gases generated escape at the top of the shaft.

The invention is clearly illustrated in the accompanying drawings in which:—

Fig. 1 is a vertical section of an electric zinc furnace with a condenser, and

Figs. 2 and 3 show in vertical sections modified constructions of the same.

In Fig. 1 the numeral 1 indicates the electric furnace chamber, 2 an upper electrode, passing through the roof of the furnace and 3 a lower electrode. 4 indicates the outlet from the furnace chamber 1 of gases, such as zinc vapors and carbon monoxide gases, generated therein, and 5 the condenser. The vertical introduction shaft 6 is directly connected to the furnace chamber 1, and from its inner wall extends a flange or wall 7 of a spiral or screw form, in such a manner, that a spiral shaped channel 16 is formed at the inner wall of the shaft. At the top, the shaft 6 is provided with a hopper 8 or the like. If required the channel 16 is made accessible from the outside through openings 9, which may be closed by shutters 10.

From the outlet 11 of the condenser 5 a pipe 13 leads to the lower part of the spiral shaped channel 16. Said pipe, in the construction shown, opens in a fire place 14 for the ignition of the carbon monoxide gas. Or the gas may be ignited by another suitable device.

The flange 7 or at least its upper surface 15 is inclined under the natural slope angle of the charge, so that the charge occupies the position, shown in the drawings. By this means the spiral shaped channel 16 is established outside of the charge through which the carbonic gases travel upwardly in direct contact with the surfaces of the charge, which, as the charge slides downwardly and passes through the inlet 17 of the smelting chamber, are renewed continually by the agitation of the charge. Thus the carbonic gases during their upward passage through the channel 16 to the outflow 18 come in contact with practically every part of the charge, whereby the charge is intensely heated, so that the moisture, contained therein, is extracted. By keeping the temperature at the top of the channel 16 at approximately 800° C. the ore is simultaneously prereduced.

The spiral shaped flange or wall 7, extending from the shaft 6 may also be formed as shown in Fig. 2, so that a closed channel 16 for the carbonic gases is established, so that the carbonic gases will not come in direct contact with the charge, but transmit their heat to said charge through said wall 7. In this construction moreover a rotating screw 19 is shown centrally in the shaft 6, by means of which the charge is further agitated during its passage down through the shaft 6. Said screw 19 preferably is so arranged and has such a direction of rotation, that it lifts that part of the charge, situated in immediate proximity of the screw, thereby assisting only in the agitation of charge, without forcing the same downwardly through the shaft 6.

Fig. 3 shows another form of the flange or wall 7, by means of which the same result is gained, as by the arrangement according to Fig. 1.

If required, a central pipe 20 may be provided through the shaft 6 containing the charge, and carbonic gases may be led through said pipe, so that the parts of the charge in contact with said central pipe, are heated.

Having now particularly described our invention and in what manner, the same is to be performed,

What we claim is:—

1. In electrothermic extraction of zinc from its ore, the method of finely dividing the charge, extracting water, contained therein, and partly reducing the charge before its introduction in the electric furnace.

2. In electrothermic extraction of zinc from its ore, the method of finely dividing the charge, heating and agitating the ore, for driving off water contained therein to a point of partly reducing the charge before its introduction in the electric furnace.

3. A method for extracting zinc from its ore consisting in agitating the charge, and heating the same during its agitation by means of non-condensable gases, escaping from the condenser of the extracted zinc vapors.

4. A method for extracting zinc from its ore consisting in agitating the charge, and heating the charge during agitation thereof by direct contact of combustion non-condensable gases escaping from the condenser of the extracted zinc vapors.

5. In an apparatus for preheating the charge for extracting zinc from its ore, the combination of a shaft for introducing the charge in the extraction chamber, means in the shaft for imparting an agitating motion to the charge, and a connection between the shaft and the condenser for generated zinc vapors for heating the charge in the shaft.

6. In an apparatus for preheating the charge for extracting zinc from its ore, the combination of a shaft for introducing the charge in an extraction chamber, spiral surfaces arranged within said shaft, and inclined under the natural angle of slope of the charge, and forming supporting surfaces for the charge, and means for heating the charge during its passage along the spiral surfaces.

7. In an apparatus for preheating the charge for extracting zinc from its ore, the combination of a condenser for generated zinc vapors, an extraction chamber, a shaft placed in communication with the extraction chamber for introducing the charge into said chamber, spiral formed surfaces placed within said shaft and forming supporting surfaces for the charge, ignition means at the lower part of the shaft and a pipe leading from the condenser for generated zinc vapors to said ignition means.

In testimony whereof we have signed our names to this specification.

EDVIN ANDREAS JOHANSSON.
GUSTAF JULIUS EKLUND.

Witnesses:
  A. Biorck,
  S. Ahlmder.